United States Patent [19]
Koizumi

[11] Patent Number: 5,850,980
[45] Date of Patent: *Dec. 22, 1998

[54] TAPE CASSETTE

[75] Inventor: Osamu Koizumi, Miyagi, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 649,636

[22] PCT Filed: Sep. 29, 1995

[86] PCT No.: PCT/JP95/02001

§ 371 Date: Jun. 1, 1996

§ 102(e) Date: Jun. 1, 1996

[87] PCT Pub. No.: WO96/10823

PCT Pub. Date: Apr. 11, 1996

[30] Foreign Application Priority Data

Sep. 30, 1994 [JP] Japan ................................ 6-261593

[51] Int. Cl.⁶ .................................................. G11B 23/087
[52] U.S. Cl. ........................................ 242/344; 360/132
[58] Field of Search .................................. 242/344, 912, 242/333.2; 360/132

[56] References Cited

U.S. PATENT DOCUMENTS

| | | | |
|---|---|---|---|
| 3,706,844 | 12/1972 | Besier et al. | 242/333.2 |
| 3,826,447 | 7/1974 | Yabu et al. | 242/332.2 |
| 4,848,698 | 7/1989 | Newell et al. | 242/912 X |
| 5,452,150 | 9/1995 | Henneberger et al. | 360/132 X |
| 5,474,249 | 12/1995 | Koizumi et al. | 242/344 X |

FOREIGN PATENT DOCUMENTS 6-12825 1/1994 Japan .

*Primary Examiner*—John Q. Nguyen
*Attorney, Agent, or Firm*—Frommer Lawrence & Haug, LLP; William S. Frommer

[57] ABSTRACT

A tape cassette provided with a tape member comprised of a magnetic tape connected to transparent leader tapes affixed to a pair of tape reels rotatably supported in a cassette body via connection tapes. In this cassette body, a light emitting element hole is located between the pair of tape reels. Light transmission holes allowing the light from the light emitting element facing the cassette body via the light emitting element hole to pass therethrough out of the cassette body with the tape member interposed therebetween are provided in the side walls orthogonal to the travelling direction of the tape member travelling over the distance between the pair of tape reels. In addition, a tape information display portion is provided in the tape member which indicates the type of the magnetic tape accommodated in the cassette body. This tape information display portion is provided at a leader tape portion positioned between the point of intersection of a line connecting the light emitting element hole and the light transmission holes and the leader tape and the end portion of the connection tape when the member is completely wound around either tape reel. Since the tape information display portion is formed on the leader tape, the amount of light reflected therefrom is not influenced by the connection tape connecting the magnetic tape to the leader tape so as to result in a high degree of precision of the amount of light detected by the light receiving element.

6 Claims, 6 Drawing Sheets

TAPE CASSETTE

FIELD OF THE INVENTION

The present invention relates to a tape cassette comprised of a cassette body in which is rotatably supported a pair of tape reels between which is wound tape member on which a data signal is recorded, and more particularly relates to a tape cassette providing at a part of the tape member an information display portion displaying information concerning the tape member such as if the tape cassette mounted in the recording and reproduction apparatus is meant for only the recording of a video signal or is meant for the recording of a data signal.

BACKGROUND ART

Conventionally, a method of detection using an optical means has been used to detect a starting end and terminal end of a tape member including a long magnetic tape accommodated in a cassette body constituting part of a tape cassette.

The tape member accommodated in the cassette body, however, has a leader tape made of a plastic with a sufficiently guaranteed mechanical strength which is connected to each of the starting end and the terminal end of the magnetic tape on which the data signal is recorded. The tape member is affixed to the tape reel via the leader tapes and is wound between these tape reels.

The magnetic tape on which a magnetic recording medium is coated and the leader tapes on which no magnetic recording medium is coated, which constitute the tape member, have different light transmittances. More specifically, when light having a wavelength of 800 nm to 900 nm is irradiated, the light transmittance of the magnetic tape is 60 percent or less, while in contrast the light transmittance of the leader tapes is 60 percent or more. Therefore, the difference of the light transmittances between these magnetic tape and leader tapes may be noted to try to detect the starting end or terminal end of a tape member. This is the principle behind the method of detection using an optical means.

To enable the detection of the starting end or the terminal end of a magnetic tape by using such an optical means, a conventional tape cassette provides, in the cassette body in which the tape member is accommodated, a light emitting element hole into which a light emitting element arranged at the recording and reproduction apparatus side is inserted. This light emitting element hole is provided so as to be positioned between the pair of tape reels rotatably supported in the cassette body. On the other hand, a light transmission hole is provided on the side of the apparatus and allows light from the light emitting element to pass therethrough and out of the cassette body with the tape member interposed therebetween. A light transmission hole is formed in each of the mutually facing side walls orthogonal to the travelling direction of the tape member travelling over the space between the pair of tape reels of the cassette body. On the recording and reproduction apparatus side, light receiving elements serve as detection elements for detecting the light passing through the transmission holes made in the cassette body. By detecting the state of the light passing through the transmission holes by these light receiving elements, the starting end or the terminal end of the tape member is detected.

More specifically, the light from the light emitting element arranged at the recording and reproduction apparatus side and facing the interior of the cassette body via the light emitting element hole is received at the light receiving elements arranged at the recording and reproduction apparatus side facing each other at the two sides of the cassette body. At this time, the light of the light receiving element arranged at the tape reel side acting as the tape supply side and the light of the light receiving element arranged at the other tape reel side acting as the tape take-up side are compared. When the detection output of one light receiving element is larger than the detection output of the other light receiving element, the tape starting end is detected. Further, where the detection output of the other light receiving element is larger than the detection output of that one light receiving element, the tape terminal end is detected. Namely, the starting end or terminal end of the tape member is detected by deciding at which side is provided the light receiving element which detects the leader tape, which is connected to the starting end or the terminal end of the magnetic tape and has a higher light transmittance than the magnetic tape.

Note that, where the detection outputs of the light receiving elements arranged at the recording and reproducing apparatus side facing each other at the two sides of the cassette body are equal, the tape member is wound around each tape reel by a certain amount and the magnetic tape is extended between the pair of tape reels and the magnetic tape of the tape member is travelling from one tape reel acting as the supply side toward the other tape reel acting as the take-up side.

A tape cassette accommodating a magnetic tape having a tape width of 8 mm sometimes accommodates a magnetic tape meant for recording only a video signal and sometimes accommodates a tape meant for recording only a data signal although the size and outer shape the cassette bodies are generally the same.

The magnetic tape to be accommodated in a tape cassette meant for recording only a video signal and the magnetic tape to be accommodated in a tape cassette meant for recording only a data signal have different characteristics such as magnetic characteristics of the magnetic medium. For this reason, a recording and reproduction apparatus meant for recording only a video signal and a recording and reproduction apparatus meant for recording only a data signal use magnetic heads adapted to the different magnetic tapes used. Further, the travelling speed of the magnetic tape differs between the two recording and reproduction apparatuses.

In this way, the specifications of the tape cassettes and the recording and reproduction apparatuses are made different, for example, the characteristics of the magnetic tape are made different, the characteristics of the magnetic heads used on the recording and reproduction apparatus side are made different, and further the tape travelling speeds are made different. Accordingly, where, for example, a tape cassette for a video signal is loaded in an apparatus designed for the recording and reproduction of a data signal, there is insufficient recording capacity and it becomes impossible to record the required data. Further, the guaranteed error rate is different between a magnetic tape meant for recording only a video signal and a magnetic tape meant for recording only a data signal. Accordingly, when a tape cassette for a video signal is used for the recording of a data signal, it becomes impossible to record the data signal with a sufficient recording characteristic and there are liable to be omissions in the data being recorded.

Therefore, while making the size and outer shape of the cassette bodies approximately the same, it is necessary to prevent a tape cassette which cannot be utilized interchangeably for both of a recording and reproduction apparatus meant for recording and reproduction of a video signal and a recording and reproduction apparatus meant for recording and reproduction of a data signal from being erroneously loaded in the wrong recording and reproduction apparatus. Particularly it is necessary to prevent a tape cassette for a video signal from being erroneously loaded in a recording and reproduction apparatus of a data signal and prevent a recording operation of the data signal from being performed.

In order to identify tape cassettes with cassette bodies of substantially the same size and outer shape but accommodating different types of magnetic tapes, a display portion has been previously provided, such as an identification hole, in the cassette body accommodating the magnetic tape. When such a display portion is provided, however, the structure of the mold for shaping this cassette body becomes more complex and the shaping of the cassette body becomes difficult. Further, the manufacturing cost of the tape cassette is increased.

Furthermore, when a display portion such as an identification hole is provided in the cassette body, it becomes necessary to newly independently provide a detection mechanism for detecting this display portion on the recording and reproduction apparatus side, which makes the configuration of the recording and reproduction apparatus more complex.

Accordingly, as a tape cassette which enables identification of tape cassettes for accommodating different magnetic tapes without changing the configuration of the cassette body accommodating the magnetic tape, the tape cassette disclosed in Japanese Unexamined Patent Publication (Kokai) No. 6-176535 has been proposed.

In the tape cassette disclosed in this publication, an optically detectable tape information display portion is provided at the transparent leader tape portion used for affixing the magnetic tape to the tape reel. Particularly, the tape information display portion is provided at the leader tape portion covered by the connection tape, which has a light transmission property and connects the end portion of the magnetic tape and the end portion of the leader tape abutting against each other.

Further, in the tape cassette disclosed in the above publication, the tape information display portion may be provided at the connection tape connecting the magnetic tape and the leader tape.

In the tape information display portion provided in the tape cassette disclosed in the above publication, certain tape information is displayed by sequentially forming a light transmission portion and an opaque portion having a difference of the light transmittances.

By providing a tape information display portion at the leader tape or the connection tape accommodated in the cassette body similar to the tape cassette disclosed in the above publication, identification tape cassettes for accommodating different types of magnetic tapes without a change of the configuration of the cassette body becomes possible. Further, the configuration of the recording and reproduction apparatus using the tape cassettes is not changed, so the compatibility of the recording and reproduction apparatus can be maintained.

The connection tape, however, is coated with a binder for connecting the magnetic tape and the leader tape. For this reason, even in a case where the leader tape and the connection tape are formed by a transparent material, the light transmittance is lowered due to the binder on the connection tape at the portion where the leader tape and the connection tape are superimposed. Particularly, when the binder changes in quality along with time, the light transmittance is further deteriorated. In a tape cassette provided with the tape information display portion for displaying the tape information by the difference of the light transmittance at the portion where the leader tape and the connection tape are superimposed, it becomes impossible for the optical detection means to correctly detect a sufficient difference of light transmittance due to the binder, so it is liable to become impossible to correctly identify the tape information displayed at the tape information display portion.

OBJECTS AND SUMMARY OF THE INVENTION

An object of the present invention is to provide a tape cassette provided with a tape information display portion enabling correct identification of the tape information by an optical detection means.

Another object of the present invention is to provide a tape cassette enabling correct identification of the tape information by the optical detection means over a long period without being influenced by aging.

Still another object of the present invention is to provide a tape cassette enabling precise recording of the information to be recorded by quick identification of the type of the tape cassette when loaded in a recording and reproduction apparatus.

So as to attain the above objects, the tape cassette according to the present invention is provided with a cassette body; a pair of tape reels rotatably supported in the cassette body; and a tape member comprised of a magnetic tape at each of the two ends of which is connected a leader tape having a light transmission property via a connection tape, these leader tapes being affixed to the tape reels, and wound while stretching over the space between the tape reels.

The cassette body is provided with a light emitting element hole positioned between the pair of tape reels. At the same time, light transmission holes for allowing the light from the light emitting element facing the interior of the cassette body via the light emitting element hole to pass therethrough out of the cassette body with the tape member interposed therebetween are provided in the side walls orthogonal to the travelling direction of the tape member travelling over the space between the pair of tape reels.

Further, the tape member is provided with at least one tape information display are in the leader tape portion positioned between the point of intersection of the line connecting the light emitting element hole and the light transmission hole and the leader tape and the connection tape when all of the tape member is wound around one of the tape reels.

Further, a transparent portion is provided between the end portion of the connection tape and the tape information display area provided at the leader tape.

Here, the tape reel around which all of the tape member is wound is used as the tape reel on the tape supply side.

When this tape cassette is loaded in a recording and reproduction apparatus, the light emitting element provided on the recording and reproduction apparatus side is inserted into the light emitting element hole provided in the cassette body and enters the interior of the cassette body. The light from the light emitting element facing the interior of this cassette body passes through the light transmission holes provided in the side walls orthogonal to the travelling direction of the tape member travelling over the space between the pair of tape reels of the cassette body and is able to be detected by the light receiving elements provided at the recording and reproduction apparatus side.

The tape cassette is either loaded in the recording and reproduction apparatus in a state where all of the tape member including the magnetic tape is wound around one tape reel or is loaded in the recording and reproduction apparatus and then all of the tape member including the magnetic tape is wound around one tape reel. The tape member is then made to travel in a direction from one tape reel to the other tape reel. When the tape information display area provided at the leader tape portion reaches the light path through which the light from the light emitting element passes to a light receiving element due to the travelling of this tape member, the light from the light emitting element is blocked by this tape information display portion. This is detected by the light receiving element as a change of the amount of light from the light emitting element and then the type of the tape member provided with the tape information display portion is identified.

DETAILED DESCRIPTION OF CERTAIN PREFERRED EMBODIMENTS OF THE INVENTION

Below, specific embodiments of the tape cassette according to the present invention will be explained by reference to the drawings.

Figure 1:
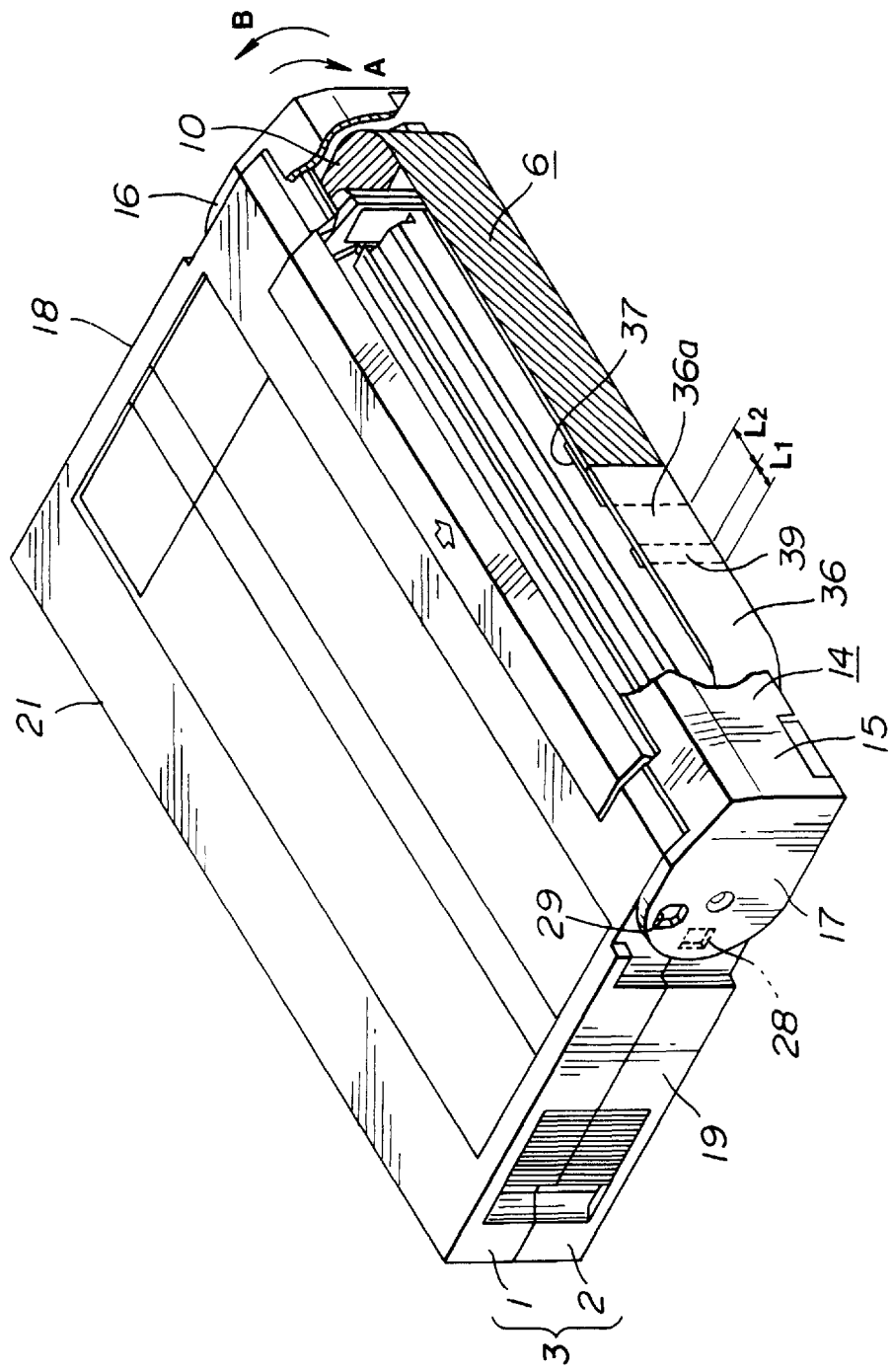
FIG. 1 is a partially sectional perspective view of a tape cassette according to the present invention.
Figure 2:
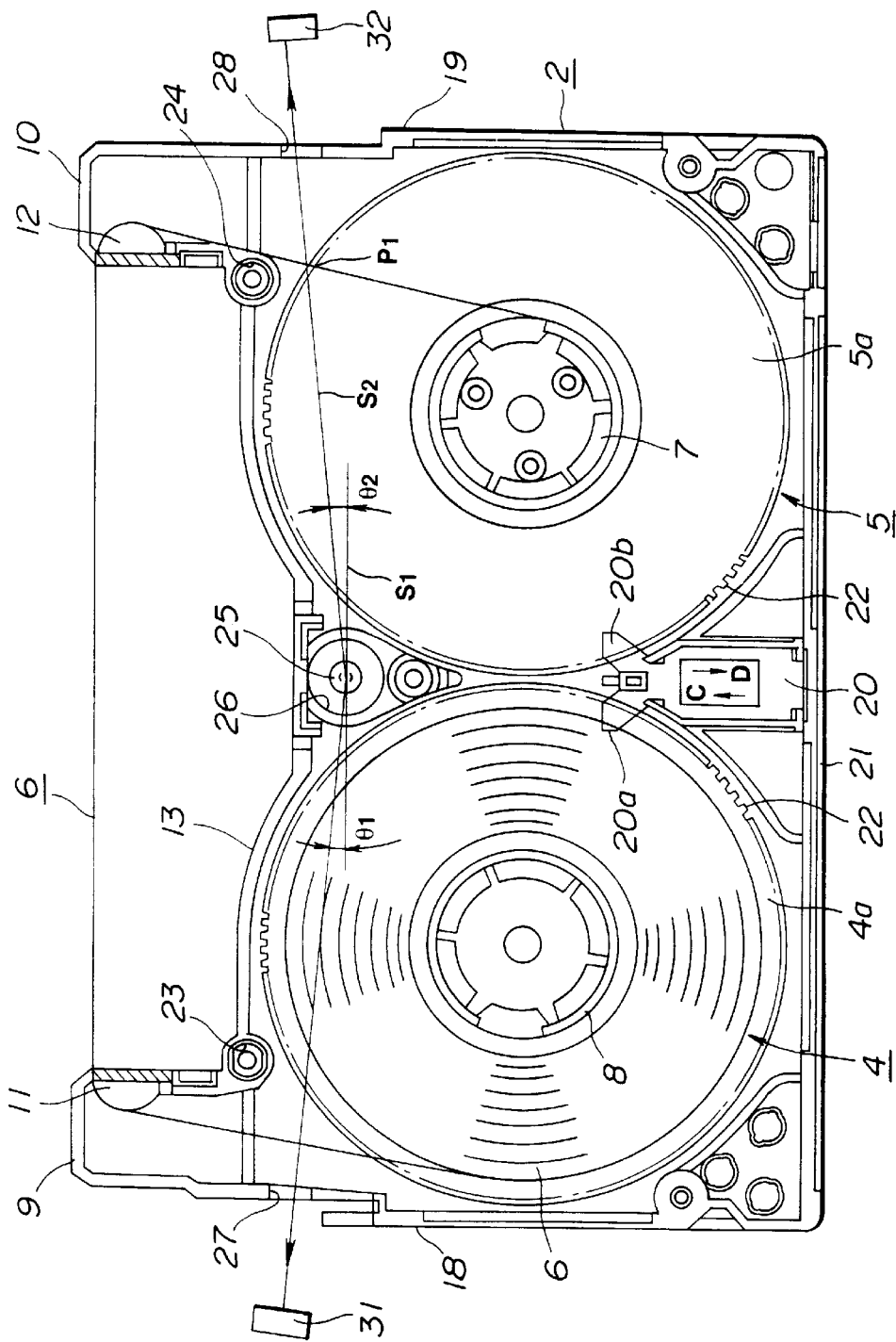
FIG. 2 is a plan view showing the interior of a cassette body constituting part of the tape cassette shown in FIG. 1.

The tape cassette according to the present invention is provided with a cassette body 3 exhibiting a square shape as shown in FIG. 1 formed by mating and connecting an upper half section 1 and lower half section 2 with each other. In this cassette body 3, as shown in FIG. 2, two tape reels 4 and 5 are rotatably supported. A tape member 6 including a magnetic tape constituted as will be explained later is wound between the two tape reels 4 and 5.

In the lower half section 2 constituting the lower side of the cassette body 3, although not illustrated, are formed reel drive shaft holes in which are arranged reel hubs 7 and 8, provided at the centers of the tape reels 4 and 5 rotatably supported in the cassette body 3, facing outward from the cassette body 3. Reel drive shafts constituting part of the reel driving mechanisms provided at the recording and reproduction apparatus side enter into these reel drive shaft holes when the tape cassette is loaded in the recording and reproduction apparatus. The reel drive shafts entering into the cassette body 3 via the reel drive shaft holes engage with the reel hubs 7 and 8 and turn the tape reels 4 and 5.

The tape member 6 wound extending over the space between the pair of tape reels 4 and 5 is drawn out of the cassette body 3 via the tape withdrawing ports 9 and 10 provided at the two sides of the front of the cassette body 3, extends along the front of the cassette body 3, and can travel over the space between the pair of tape reels 4 and 5. As shown in FIG. 2, tape guides 11 and 12 which guide the travelling direction of the tape member 6 travelling over the space between the pair of tape reels 4 and 5 are provided at the sides of the opening ends of the tape withdrawing ports 9 and 10. These tape guides 11 and 12 guarantee smooth sliding contact of the tape member 6 by having surfaces coming into sliding contact with the tape member 6 bulging out in an arc shape.

Further, in the portion over the space between the tape withdrawing drawing ports 9 and 10 on the front side at which the tape member 6 of the cassette body 3 extends, there is provided a tape loading recess 13 which the tape withdrawing member constituting part of the tape loading mechanism provided on the recording and reproduction apparatus side faces. When the tape cassette is loaded in the recording and reproduction apparatus, the tape withdrawing member enters into the tape loading recess 13 and faces the back surface of the tape member 6 extending along the front of the cassette body 3. By driving the tape loading mechanism, the tape member 6 is withdrawn from the cassette body 3 and the tape member 6 is loaded into a predetermined tape travelling path.

The front side of the cassette body 3 has pivotally attached to it an opening and closing lid 14 so as to protect the tape member 6 withdrawn from the cassette body 3 and extending over the front of this cassette body 3, as shown in FIG. 1. This opening and closing lid 14 is pivotally attached to the cassette body 3 by forming pivot pieces 16 and 17 at the two sides of a covering plate 15 covering the front of the cassette body 3 and pivotally supporting these pivot pieces 16 and 17 via supporting shafts at the two facing side walls 18 and 19 orthogonal to the front of the cassette body 3. The opening and closing lid 14 is biased to pivot in the direction indicated by the arrow A in FIG. 1, that is, a direction for constantly closing the front of the cassette body 3, by a biasing means provided in the cassette body 3 such as a coil spring and covers the tape member 6 extending over the front of the cassette body 3. When the tape cassette is loaded in the recording and reproduction apparatus, the opening and closing lid 14 is pivoted in the direction indicated by the arrow B in FIG. 1 against the biasing force of the biasing means by a lid opening and closing mechanism provided on the apparatus side, thereby to open the front of the cassette body 3 and enables the tape member 6 to be withdrawn out of the cassette body 3.

The cassette body 3 prevents unintentional withdrawing of the tape member 6 wound between the pair of tape reels 4 and 5 by being provided with a reel lock member 20 limiting the rotation of the tape reels 4 and 5. This reel lock member 20 is arranged so as to be positioned at the back wall 21 of the cassette body 3 as shown in FIG. 2 and is moveable in the direction indicated by the arrow C and the direction indicated by the arrow D in FIG. 2 to and back from a space between the pair of tape reels 4 and 5. The reel lock member 20 is constantly biased in the direction indicated by the arrow C in FIG. 2 by a biasing means such as a coil spring so as to enter into the space between the pair of tape reels 4 and 5. Reel lock pawls 20a and 20b provided at the front ends engage with gear portions 22 formed at the outer circumferential edges of flanges 4a and 5a of the tape reels 4 and 5 to restrict the rotation of the tape reels 4 and 5. When the tape cassette is loaded in the recording and reproduction apparatus, the reel lock member 20 is moved in the direction indicated by the arrow D in FIG. 2 against the biasing force of the biasing means by a reel lock releasing function provided at the apparatus side, releases the lock of the tape reels 4 and 5 to allow these tape reels 4 and 5 to rotate, and makes the feedout of the tape member 6 from the cassette body 3 possible.

The lower half section 2 constituting the lower side of the cassette body 3 is further provided with a pair of positioning holes 23 and 24 engaging with positioning pins for positioning the loading position of the tape cassette in the horizontal direction when the tape cassette is loaded in the recording and reproduction apparatus. These positioning holes 23 and 24 are provided in the vicinity of the position at which the tape member 6 is fed out from the pair of tape reels 3 and 4 as shown in FIG. 2. By providing a pair of positioning holes 23 and 24 in this way, when the tape cassette is loaded in the recording and reproduction apparatus, the starting position of travelling of the tape member 6 fed out from the tape cassette is correctly defined and stable travel of tape member 6 becomes possible.

The tape cassette configured as mentioned above is provided with a tape information display area 39 which can detect the starting end and terminal end of the tape member 6 accommodated in the cassette body 3 or the type of the accommodated tape member 6 by an optical detection means provided at the recording and reproduction apparatus side when this tape cassette is loaded in a recording and reproduction apparatus.

The lower half section 2 constituting the lower side of the cassette body 3 is provided with a light emitting element hole 26 into which is inserted a light emitting element 25 such as an LED constituting part of the tape member detection mechanism provided at the recording and reproduction apparatus side. This light emitting element hole 26 is provided at a position on the front side of the cassette body 3 so as to fall between the pair of tape reels 4 and 5 as shown in FIG. 2. Further, the side walls 18 and 19 of the cassette body 3 have light transmission holes 27 and 28 for allowing the light from the light emitting element 25 inserted into the light emitting element hole 26 to pass therethrough out of the cassette body 3 with the tape member 6 travelling over the space between the pair of tape reels 4 and 5 interposed therebetween. These light transmission holes 27 and 28 are provided at the pivoting portions of the side walls 18 and 19 where the pivot pieces 17 and 18 of the opening and closing lid 14 are provided and are square in shape. The light transmission holes 27 and 28 are closed by the pivot pieces 17 and 18 when the opening and closing lid 14 is pivoted to a position closing the front of the cassette body 3 and register with the through holes 29 made in the pivot pieces 17 and 18 and open when the opening and closing lid 14 is pivoted to a position opening the front of the cassette body 3.

The light transmission holes 27 and 28 are provided at positions where the angles $\theta_1$ and $\theta_2$ formed by a line $S_1$ which passes through the center of the light emitting element hole 26 and is in parallel to the travelling direction of the tape member 6 travelling along the front of the cassette body 3 over the space between the pair of tape reels 4 and 5 and a line $S_2$ connecting the center of the light emitting element hole 26 and the centers of the light transmission holes 27 and 28 are about 5.5 degrees.

Note that the recording and reproduction apparatus side are provided with light receiving elements 31 and 32 such as photodetectors which receive the light from the light emitting element inserted into the light emitting element hole 26 and entering into the cassette body 3 positioned on the extension of the line $S_2$ connecting the center of the light emitting element hole 26 and the centers of the light transmission holes 27 and 28.

Figure 3:
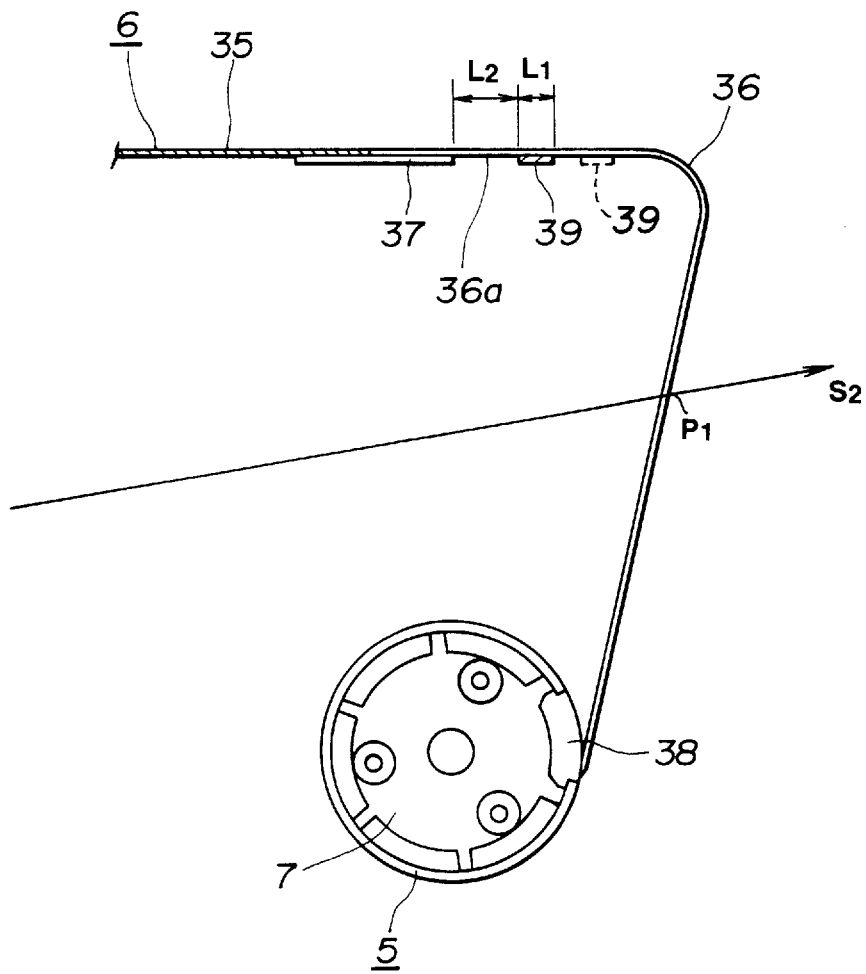
FIG. 3 is an enlarged perspective view of principal parts showing the position at which the tape information display portion is provided.

On the other hand, the tape member 6 accommodated in the cassette body 3 wound over the space between the pair of tape reels 4 and 5 is constituted by, as shown in FIG. 3, a magnetic tape 35 coated with a magnetic recording medium on which an information signal such as a data signal is to be recorded and leader tapes 36 formed by a plastic with a sufficiently guaranteed mechanical strength which are connected to the two ends, that is, the starting end and terminal end, of this magnetic tape 35. The leader tapes 36 are formed by a plastic material such as a transparent polyethylene terephthalate (PET).

The magnetic tape 35 and the leader tapes 36 are laid end to end without superposition and connected by connection tape 37 provided on one surface with a sticky layer made of a binder etc. Note that, the connection tape 37 is bonded to the surface of the magnetic tape 35 on the side not coated with the magnetic recording medium so as to connect the magnetic tape 35 and the leader tapes 36.

The leader tapes 36 constituting part of the tape member 6 are formed by a transparent or semi-transparent plastic material having a light transmission property. On the other hand, the magnetic tape 35 is formed by coating a magnetic recording medium on one surface of a substrate made of a plastic and therefore is given a remarkably smaller light transmittance compared with the leader tapes 36. Further, the connection tape 37 is formed by the same material as that for the leader tapes 36, but formed by providing a sticky layer on one surface to thereby obtain a smaller light transmittance compared with the leader tapes 36.

The tape member 6 is wound between the tape reels 4 and 5 with the end portions of the leader tapes 36 connected to the end portions of the magnetic tape 35 and affixed to the tape reels 4 and 5. The leader tapes 36 are affixed to the tape reels 4 and 5 while being grasped by clamps 38 provided at the tape reels 4 and 5. The leader tapes 36 have a length from the fixed end of one of the tape reels 5 and 4 to the vicinity of the tape drawing port 9 or 10 of the cassette body 3 when all of the tape member 6 is taken up around the other of the tape reels 4 and 5. In the present embodiment, the leader tapes 36 have a length from the fixed end of one of the tape reels 4 and 5 to approximately the center of the front side of the cassette body 3 when all of the tape member 6 is taken up around the other of the tape reels 5 and 4.

The tape member 6 accommodated in the tape cassette according to the present invention is provided with a tape information display area 39 showing that the magnetic tape 35 constituting part of this tape member 6 is used for the recording of only a data signal. This tape information display area 39 is provided at the leader tape 36 portion positioned between the point of intersection $P_1$ of the line $S_2$ connecting the center of the light emitting element hole 26 and the center of the light transmission holes 27 and 28 and the leader tape 36 and the connection tape 37 when all of the tape member 6 is wound around a tape reel 4 acting as the tape supply side as shown in FIG. 3.

The tape information display area 39 is formed so that one part of the leader tape 36 has approximately the same light transmittance as the light transmittance of the magnetic tape 35. More specifically, the tape information display portion 39 is formed by coating on one part of the leader tape 36 a material lowering the light transmittance so as to give a light transmittance of 60 percent or less, equivalent to the magnetic tape 35, when light having a wavelength of 800 nm to 900 nm is irradiated.

So as to give a light transmittance equivalent to that of the magnetic tape 35 to the tape information display area 39, there are used a magnetic recording medium such as Co—Ni coated on the magnetic tape 35, carbon black, or metal such as aluminum, or further a resin material such as an ultraviolet-curable resin. The material lowering the light transmittance is coated on the leader tape 36 by silk screen printing, pad printing, or other printing to form the tape information display area 39. The step of forming the tape information display area 39 by such printing may be performed even after winding the tape member 6 between the tape reels 4 and 5, so it becomes possible to provide this tape information display area 39 even with respect to a tape member 6 accommodated in a cassette body 3 without the tape information display area 39.

Where a magnetic recording medium is used as the material forming the tape information display area 39, similar to the case of forming the magnetic tape 35, it can be formed by a vacuum thin film forming technology such as evaporation deposition or sputtering.

The tape information display area 39 provided at the position as mentioned above is located on the tape reel 4 side further from the point of intersection $P_1$ between the line $S_2$ connecting the center of the light emitting element hole 26 and the center of the light transmission holes 27 and 28 and the leader tape 36 when winding all of the tape member 6 around the tape reel 4 acting as the tape supply side as shown in FIG. 3. Accordingly, when the tape cassette is loaded in the recording and reproduction apparatus in the state with all of the tape member 6 taken up around the tape reel 4 acting as the tape supply side or the tape cassette is loaded in the recording and reproduction apparatus and then all of the tape member 6 is taken up around the tape reel 4 and then the reel driving mechanism on the recording and reproduction apparatus side is driven to perform forward rotation to make the tape member 6 travel from the tape reel 4 toward the other tape reel 6 acting as the take-up side, the transparent portion of the leader tape 36 passes the line $S_2$ connecting the center of the light emitting element hole 26 and the center of the light transmission holes 27 and 28. In this manner, the light path of the light emitted from the light emitting element 25 and is received by the light receiving elements 31 and 32 passes through (1) a transparent portion of the leader tape, then (2), the tape information display area 39 having a low light transmittance and then (3) the transparent portion 36a of the leader tape 36 passes again. As a result, the amount of light received by the light receiving elements 31 and 32 changes in accordance with the passing of the transparent portion of the leader tape 36, the tape information display area 39, and the transparent portion 36a of the leader tape 36. The light receiving element 32 outputs a detection output in accordance with the change of the amount of the light received. By detecting the fluctuation of this detection output by waveform-shaping by the waveform shaping circuit, the tape information display area 39 can be detected. When detecting this tape information display area 39, it is determined that the tape member 6 is one to which a magnetic tape 35 used for the recording of only a data signal is connected. Namely, it is determined that the tape cassette loaded in the recording and reproduction apparatus is for a data signal.

Note that, a tape cassette for which the tape information display area 39 is not detected is determined to be for recording of only a video signal.

When a tape member 6 having a width of 8 mm is used for a tape cassette accommodating the tape member, the length $L_1$ of the tape information display area 39 in the longitudinal direction of the tape member 6 is set to be approximately 3 mm. This is because the light transmission holes 27 and 28 provided in a tape cassette accommodating a tape member 6 having a width of 8 mm are formed in a square shape having a length of 2.5 mm at each side and, further, when all of the tape member 6 is wound around the tape reel 4 acting as the tape supply side, as shown in FIG. 2, the tape member 6 intersects the line $S_2$ connecting the center of the light emitting element hole 26 and the center of the light transmission holes 27 and 28 at an angle, i.e., without being orthogonal to the line $S_2$. Namely, the length $L_1$ is set so as to reliably cover the light transmission holes 27 and 28 exhibiting a square shape of a length of 2.5 mm on a side by the tape information display area 39 even in a case where the tape member 6 travels inclined with respect to the line $S_2$ connecting the center of the light emitting element hole 26 and the center of the light transmission holes 27 and 28.

Figure 4:
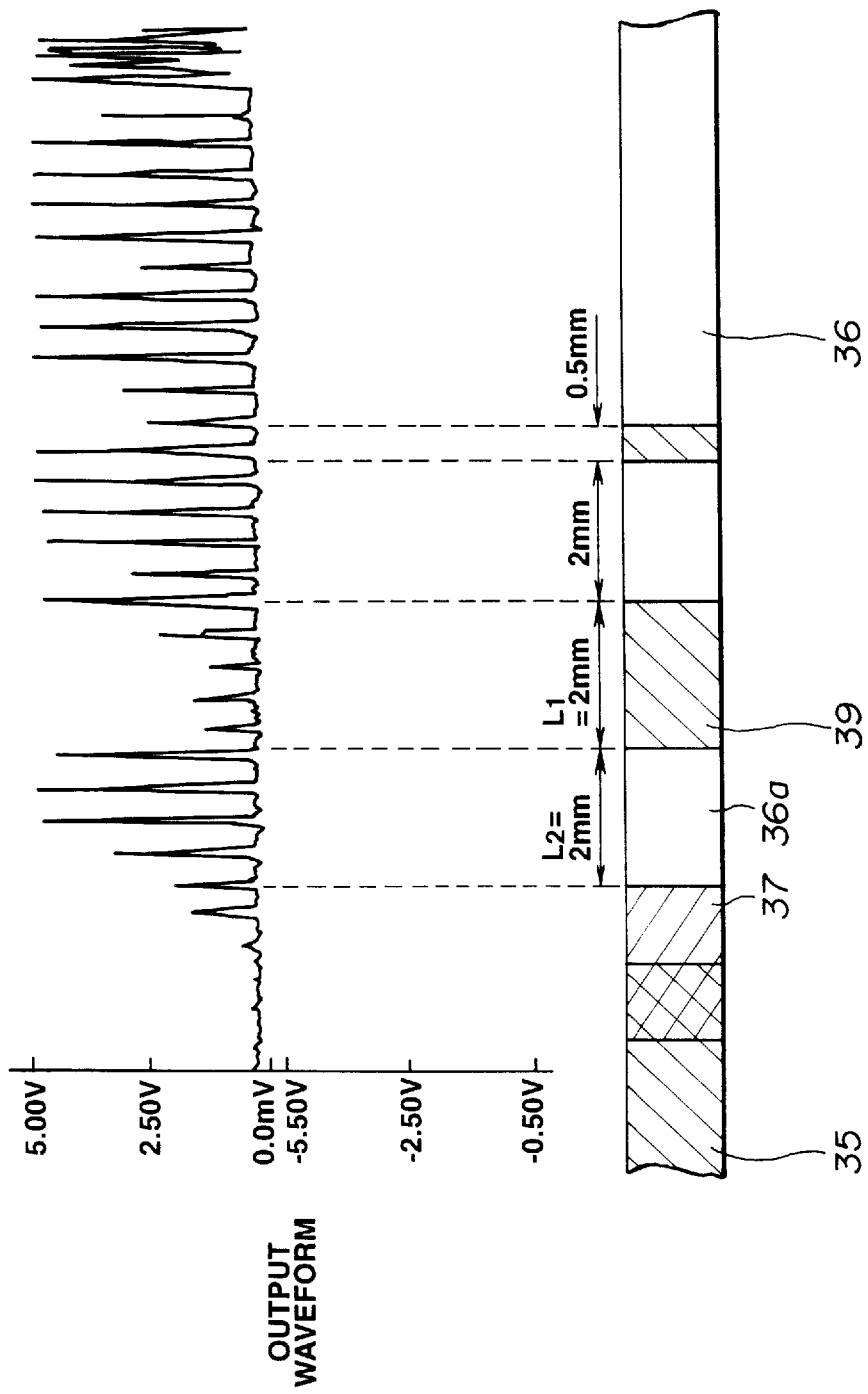
FIG. 4 is a view of the output waveform detected by a light receiving element when the tape information display portion is set to 2 mm.
Figure 5:
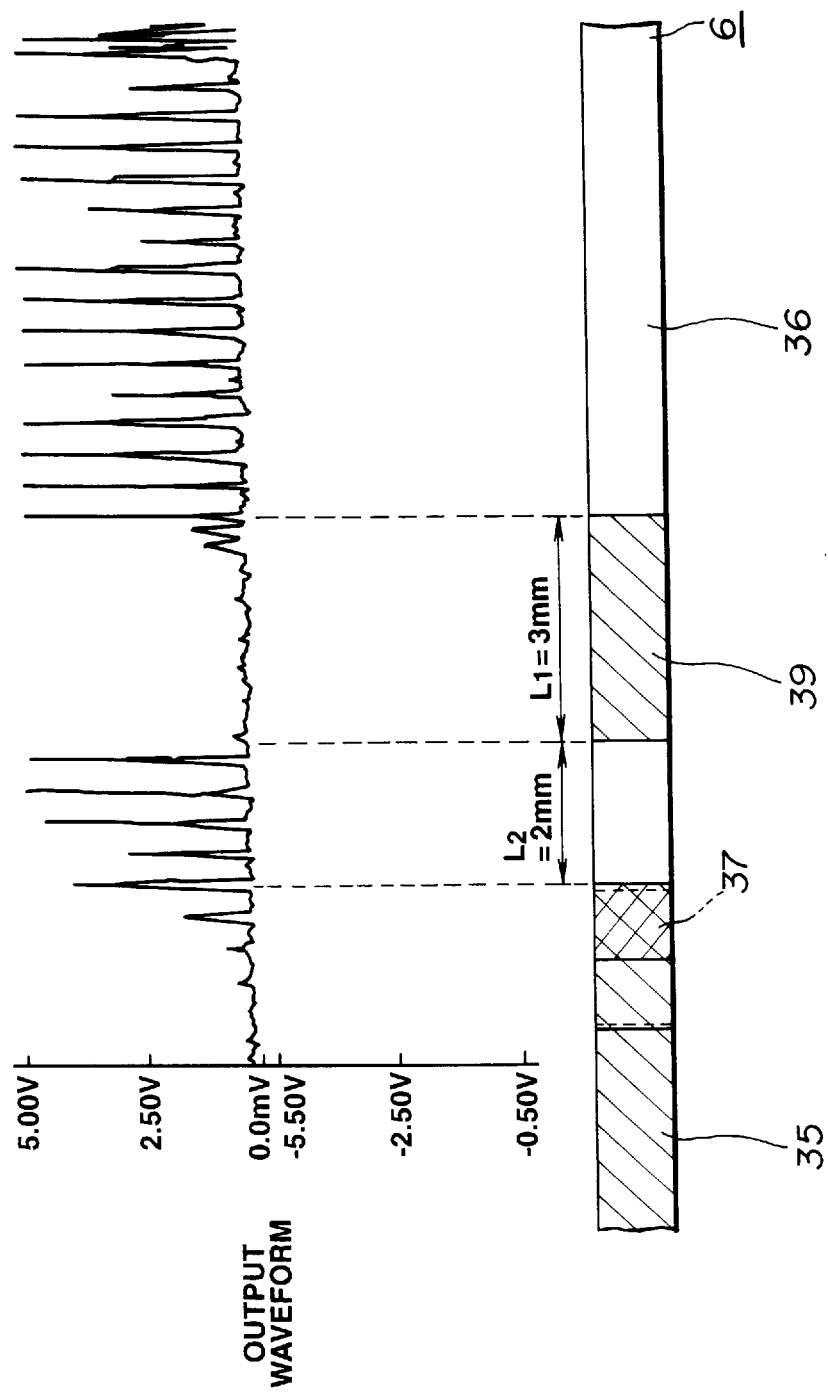
FIG. 5 is a view of the output waveform detected by a light receiving element when the tape information display portion is set to 3 mm.

In actuality, when comparing the fluctuation of the detection output of the light from the light emitting element 25 detected by the light receiving elements 31 and 32 to the case where the length $L_1$ of the tape information display area 39 is set to 2 mm and the case where it is set to 3 mm, the result becomes as shown in FIG. 4 and FIG. 5. Namely, when the magnetic tape 35 portion is detected by the light receiving elements 31 and 32, the detection output is set to 0 mV, when the tape information area portion 39 given a light transmittance equivalent to that of the magnetic tape 35 is detected, the detection output of the light receiving elements 31 and 32 becomes 0 mV the same as the detection output when the magnetic tape 35 portion is detected. Where the length $L_1$ of the tape information display area 39 is set to 2 mm, however, as shown in FIG. 4, a detection output of about 1.3 mV is obtained. On the other hand, where the length $L_1$ of the tape information display area 39 is set to 3 mm, as shown in FIG. 5, similar to the detection of the magnetic tape 35 portion, only a detection output of about 0 mV can be obtained. This is because, where the length $L_1$ of the tape information display area 39 is set to about 3 mm, the light transmission holes 27 and 28 are completely covered by the tape information display area 39, but where the length $L_1$ of the tape information display area 39 is set to 2 mm, the light transmission holes 27 and 28 are not completely covered by the tape information display area 39 and an amount of the leakage light is detected by the light receiving elements 31 and 32. Accordingly, where the invention is applied to a tape cassette accommodating a tape member 6 having a width of 8 mm, it is necessary to form the tape information display area 39 so as to have a length $L_1$ in the longitudinal direction of the tape member 6 of about 3 mm or a length slightly longer than 3 mm.

Further, since the tape information display area 39 is detected by a fluctuation of the detection output caused by the change of the amount of the light received by the light receiving elements 31 and 32, a transparent portion 36a having a constant length $L_2$ is provided at a part of the leader tape 36 near the end portion, on the leader tape 36 side, of the connection tape 37 connecting the magnetic tape 35 and the leader tape 36. Since the light transmittance of the tape information display area 39 is set to 60 percent or less, equivalent to the light transmittance of the magnetic tape 35, in this embodiment, the length $L_2$ of this transparent portion 36a is set to a length that enables 60 percent or more of the light emitted from the light emitting element 25 to be received at the light receiving elements 31 and 32. Namely, this is because, by setting the length $L_2$ of the transparent portion 36a so as to give a light transmittance of 60 percent or less, a fluctuation is caused in the detection output caused by the change of the amount of light received by the light receiving elements 31 and 32 between this transparent portion 36a and the tape information display area 39 having a light transmittance of 60 percent or less, so detection of the tape information display area 39 becomes possible by the fluctuation of this detection output.

To secure a light transmittance for the transparent portion 36a of 60 percent or more, in the present embodiment, a length of more than 1.8 mm becomes necessary. Namely, when assuming that the amount of light from the light emitting element 25 received at the light receiving elements 31 and 32 in a state where the light transmission holes 27 and 28 are completely opened is 100 percent, to secure 60 percent or more light received at the light receiving elements 31 and 32, the light transmission holes 27 and 28 must be opened 60 percent or more. When assuming that the light transmittance of the transparent portion 36a is 100 percent, it becomes necessary that it have a length long enough to open the light transmission holes 27 and 28 by 60 percent or more. Here, so as to completely open the light transmission holes 27 and 28 formed in the square shape having a length of 2.5 mm at a side, conversely to the length $L_1$ of the tape information display area 39 mentioned before, a transparent portion 36a having a length $L_2$ of 3 mm or more becomes necessary. Therefore, so as to open the light transmission holes 27 and 28 by 60 percent or more, it becomes necessary to set the length of the transparent portion 36a to 1.8 mm or more which is 60 percent of the 3 mm length for complete opening of the light transmission holes 27 and 28. Accordingly, in the present embodiment, a transparent portion 36a having a length $L_2$ of 1.8 mm or more is provided between the end portion of the leader tape 36 side of the connection tape 37 and the tape information display area 39. Note that, so as to make sure that the transparent portion 36a has a light transmittance of 60% or more, desirably the length thereof is set to 2 mm or more.

Further, so as to enable reliable detection of the tape information display portion 39 by the light receiving elements 31 and 32, when all of the tape member 6 is taken up around the tape reel 4 acting as the supply side, the reel driving mechanism on the recording and reproduction apparatus side is made to perform a forward rotation, and the tape member is made to travel from one tape reel 4 toward the other tape reel 5 acting as the take-up side, after the tape member 6 travels for a constant length, desirably the light path through which the light which is emitted from the light emitting element 25 and received at the light receiving elements 31 and 32 passes is blocked by the tape information display area 39. Accordingly, in the present embodiment, the tape information display area 39 is provided at a position spaced by 60 mm to 65 mm from the point of intersection $P_1$ of the line $S_2$ connecting the center of the light emitting element hole 26 and the center of the light transmission holes 27 and 28 and the tape member 6 in a state where all of the tape member 6 is taken up around the tape reel 4 acting as the supply side.

Note that where only the tape reel 4 is defined as the supply side, it is enough to provide the tape information display area 39 at only one end portion of the tape member 6, but where the tape member 6 is made to travel in both of the forward and reverse directions to enable the recording of a data signal, the tape information display area 39 is provided at each of the two end portions of the tape member 6.

Further, it is also possible that a plurality of tape information display areas 39 are provided at one or both of the end portions of the tape member 6 (see dotted area 29 in FIG. 3). It is possible to show that the tape cassette is for recording a data signal when one tape information display area 39 is provided and the fluctuation of the detection output is detected one time by the light receiving elements 31 and 32 and possible to show that the tape cassette is for recording a video signal when two tape information display areas 39 are provided and the fluctuation of the detection output is detected two times by the light receiving elements 31 and 32.

Figure 6:
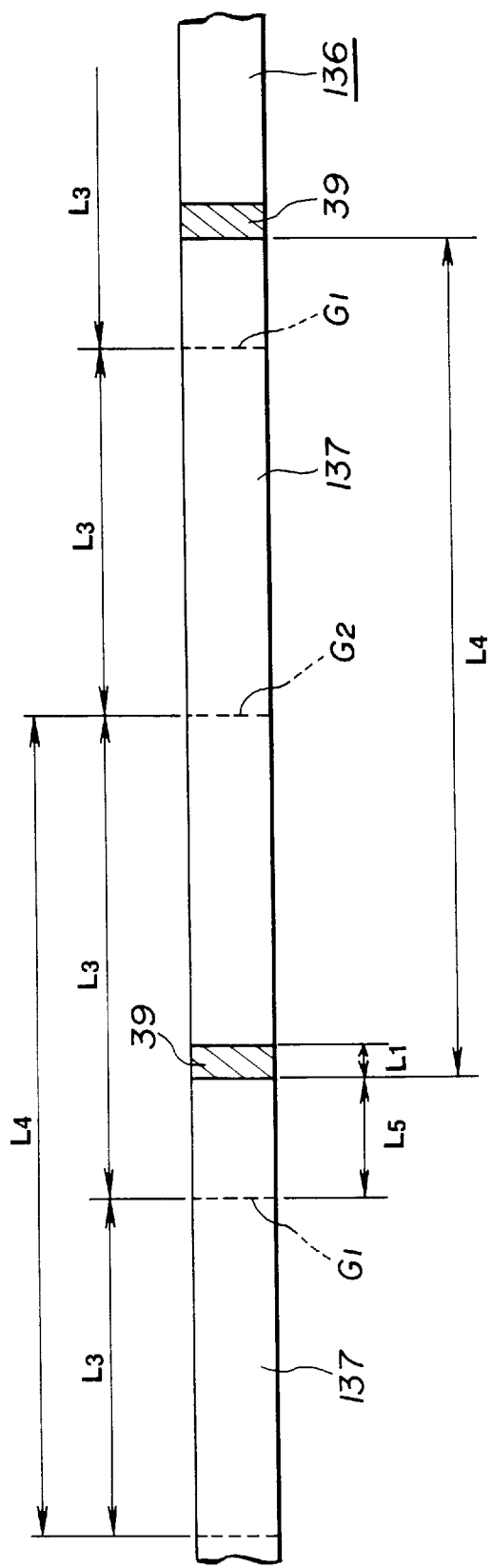
FIG. 6 is a plan view explaining the state where a leader tape constituting part of the tape member accommodated in the tape cassette according to the present invention is prepared.

To form the leader tapes 36 for a tape member 6 having a leader tape 36A provided with the tape information display area 39 connected to one end portion of the magnetic tape 35 and having a leader tape 36B not provided with the tape information display portion connected to the other end portion, as shown in FIG. 6, a long tape 136 cut into pieces each having for example the width of the leader tape 36 is prepared. The tape information display area 39 are sequentially provided on units of the leader tape material having a length $L_4$ two times longer than the length $L_3$ of the leader tapes 36A and 36B connected to the end portions of the magnetic tape 35. Namely, a tape information display area 39 having a length $L_1$ as mentioned before is provided at one end portion of a unit length $L_4$. The position spaced from one end edge of the tape information display portion 39 by a length $L_5$, comprised of the length $L_2$ of the transparent portion 36a and a length for bonding with the connection tape 37 for bonding with the magnetic tape 35 is defined as a first reference cut position $G_1$. By using this first reference cut position $G_1$ as reference and cutting the tape material 136 using as the position corresponding to the length $L_3$ of the leader tape 36A as a second reference cut position $G_2$, it is possible to successively form a leader tape 36A in which the tape information display area 39 is provided and a leader tape 36B not having a tape information display portion.

Here, the tape information display area 39 can be formed by coating carbon black on a predetermined length $L_1$ of the tape material 136.

The tape cassette according to the present invention is formed by providing a tape information display area at a portion of the leader tape which is not superimposed by the connection tape, so the tape information display area can be correctly detected by an optical detection means without being influenced by the connection tape. Further, the identification of the tape information can be correctly carried out by the optical detection means for a long period without being affected by aging.

What is claimed is:

1. A tape cassette comprising:
   a cassette body having side walls thereof,
   a pair of tape reels rotatable supported in said cassette body, and
   a tape member comprised of a magnetic tape having leader tape portions connected at the end portions thereof by means of a connection tape with said leader tape being fixed respectively to said tape reels wherein said cassette body comprises:
   a light emitting element hole positioned between said pair of tape reels into which a light emitting element is inserted, and
   light transmission holes positioned with respect to said light emitting element to allow light from the light emitting element facing the interior of said cassette body to pass therethrough when said tape member is interposed therebetween, said light transmission holes being provided in one of said side walls orthogonal to the travelling direction of the tape member travelling between said pair of tape reels, and wherein said tape member including at least one discrete tape information display area having a leading end portion and a trailing end portion thereof connected to one of the leader tape portions and none of said discrete tape information display area between said leading end portion and said trailing end portion thereof is covered by said connection tape and the entirety of said discrete tape information display area is spaced from said connection tape by a predetermined distance, said at least one discrete tape information display area being positioned between a point of intersection of a line connecting said light emitting element hole and one of said light transmission holes and said one leader tape portion and an end portion of said connection tape when the tape member is completely wound around one of the pair of tape reels.

2. A tape cassette according to claim 1, wherein the entirety of said magnetic tape is wound around a tape supply reel of said pair of tape reels.

3. A tape cassette according to claim 1, wherein said tape member comprises said magnetic tape, said leader tape portions connected to the two ends of said magnetic tape, said leader tape portions having a light transmittance higher than the light transmittance of said magnetic tape, and said connection tapes extending over and connecting said magnetic tape and said leader tape portions; and said discrete tape information display area is positioned along said leader tape portion at a portion of the leader tape portion near an end portion of said connection tape but spaced therefrom by a predetermined distance.

4. A tape cassette according to claim 3 wherein said discrete tape information display area is formed by coating a material on one part of said leader tape portion which lowers the light transmittance thereof so as to obtain a light transmittance of said discrete tape information display area which is approximately the same as the light transmittance of said magnetic tape.

5. A tape cassette according to claim 3, wherein a plurality of said discrete tape information display areas are formed at predetermined intervals on the leader tape portion connected to one end of said magnetic tape.

6. A tape cassette according to claim 3, wherein said discrete tape information display area is provided along one of the leader tape portions connected to the two ends of said magnetic tape.

* * * * *